(12) United States Patent
Stone

(10) Patent No.: US 10,051,838 B2
(45) Date of Patent: Aug. 21, 2018

(54) PET TOY WITH VARIABLE ELASTICITY

(71) Applicant: The KONG Company, LLC, Golden, CO (US)

(72) Inventor: John James Stone, Golden, CO (US)

(73) Assignee: THE KONG COMPANY, LLC, Golden, CO (US)

( * ) Notice: Subject to any disclaimer, the term of this patent is extended or adjusted under 35 U.S.C. 154(b) by 317 days.

(21) Appl. No.: 14/840,764

(22) Filed: Aug. 31, 2015

(65) Prior Publication Data

US 2016/0309682 A1    Oct. 27, 2016

Related U.S. Application Data

(60) Provisional application No. 62/151,505, filed on Apr. 23, 2015.

(51) Int. Cl.
*A01K 15/02* (2006.01)

(52) U.S. Cl.
CPC .................................. *A01K 15/025* (2013.01)

(58) Field of Classification Search
CPC ............................ A01K 15/025; A01K 15/026
USPC .................................................. 119/702, 707
See application file for complete search history.

(56) References Cited

U.S. PATENT DOCUMENTS

| | | | | |
|---|---|---|---|---|
| 2001/0008125 | A1* | 7/2001 | Mann | A01K 15/026 119/709 |
| 2007/0234969 | A1* | 10/2007 | Lynch | A01K 15/02 119/707 |
| 2009/0255482 | A1* | 10/2009 | Santarsiero | A01K 15/025 119/707 |
| 2010/0224138 | A1* | 9/2010 | Axelrod | A01K 15/026 119/710 |
| 2011/0017148 | A1* | 1/2011 | Tsengas | A01K 15/025 119/707 |
| 2013/0167780 | A1* | 7/2013 | Axelrod | A01K 15/025 119/710 |
| 2013/0260638 | A1* | 10/2013 | Lamprey, Jr. | A63H 5/00 446/213 |
| 2014/0130748 | A1* | 5/2014 | Curry | A01K 15/025 119/707 |
| 2014/0130750 | A1* | 5/2014 | Valle | A01K 15/025 119/708 |
| 2014/0270931 | A1* | 9/2014 | Jager | A01K 15/025 403/343 |

(Continued)

*Primary Examiner* — Monica L Williams
(74) *Attorney, Agent, or Firm* — Berg Hill Greenleaf & Ruscitti LLP

(57) ABSTRACT

A pet toy incorporates distinct materials having differing elastomeric features and others. The pet toy has an inner member and an outer shell that covers selected portions of the inner member such that an exposed exterior surface of the toy includes both portions of the inner member and outer shell. The inner member is more elastic or compressible as compared to the outer shell that is stiffer or more resilient. Yet, the outer shell still maintains an elastomeric response to contact. A noise making device may be mounted within an interior chamber of the outer shell. The inner member has a central opening to receive the chamber housing that interlocks the inner member and outer shell. Exposed portions of the inner member may be flush with the outer surface of the outer shell or may protrude beyond the exterior surface.

17 Claims, 10 Drawing Sheets

(56) References Cited

U.S. PATENT DOCUMENTS

| | | | | |
|---|---|---|---|---|
| 2014/0318472 A1* | 10/2014 | Day | ............... | A01K 15/025 119/707 |
| 2014/0373788 A1* | 12/2014 | Ragonetti | ............ | A01K 15/025 119/51.01 |
| 2015/0237829 A1* | 8/2015 | Tsengas | ............... | A01K 15/025 119/709 |
| 2015/0373950 A1* | 12/2015 | Spring | ................ | A23K 40/00 119/710 |
| 2016/0106068 A1* | 4/2016 | Axelrod | ............. | A01K 15/026 119/710 |
| 2016/0174526 A1* | 6/2016 | Ma | ..................... | A01K 15/025 446/397 |

\* cited by examiner

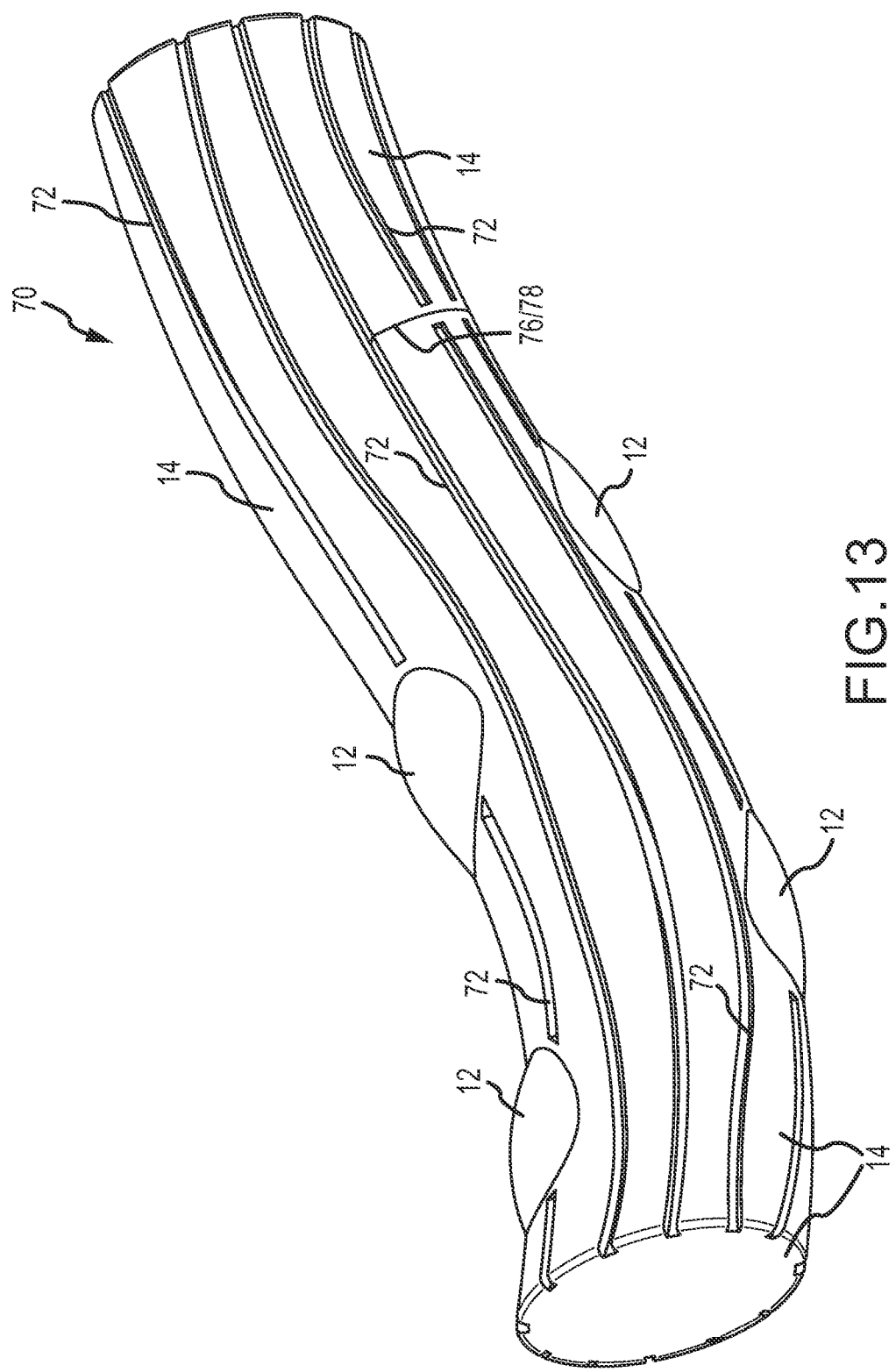

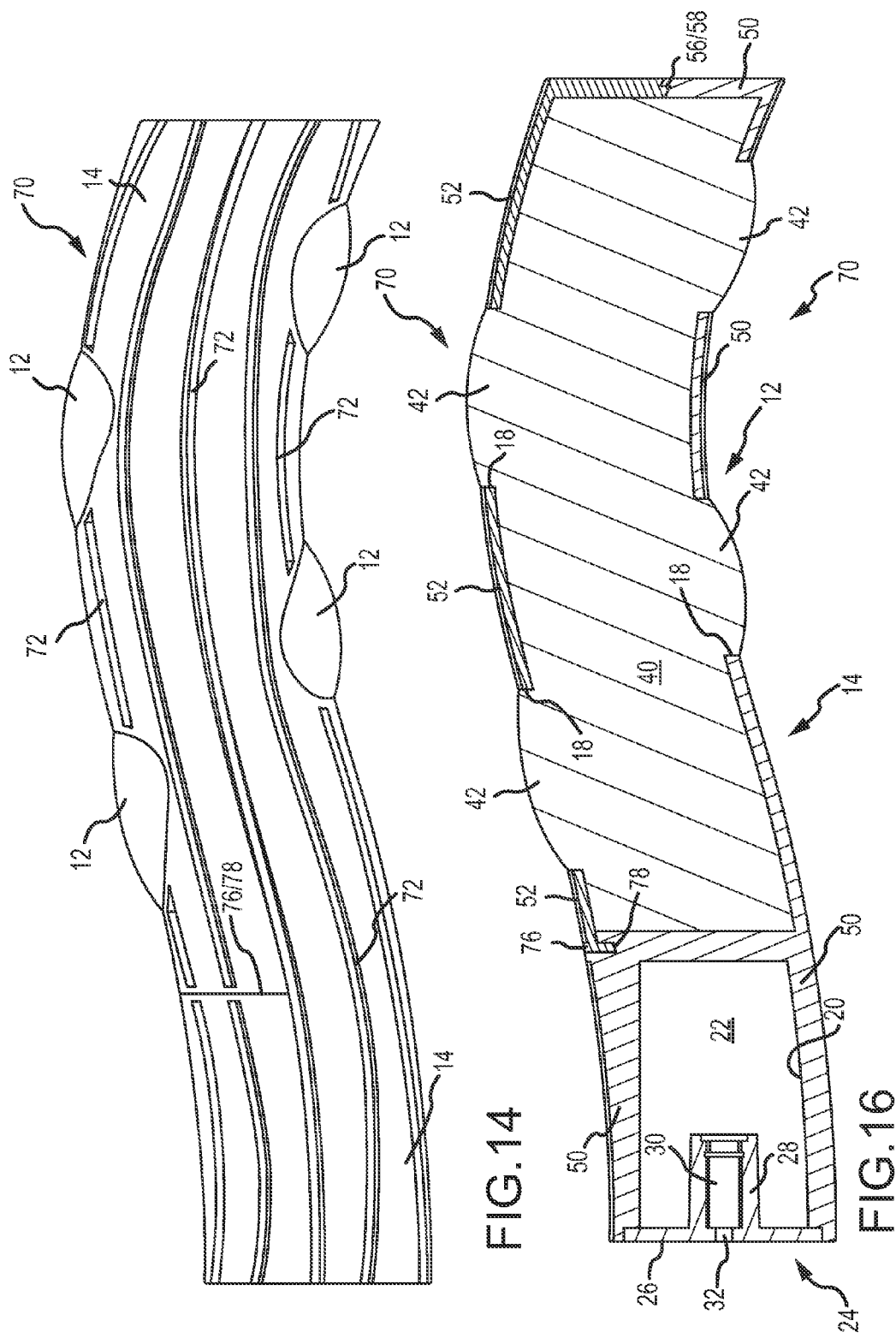

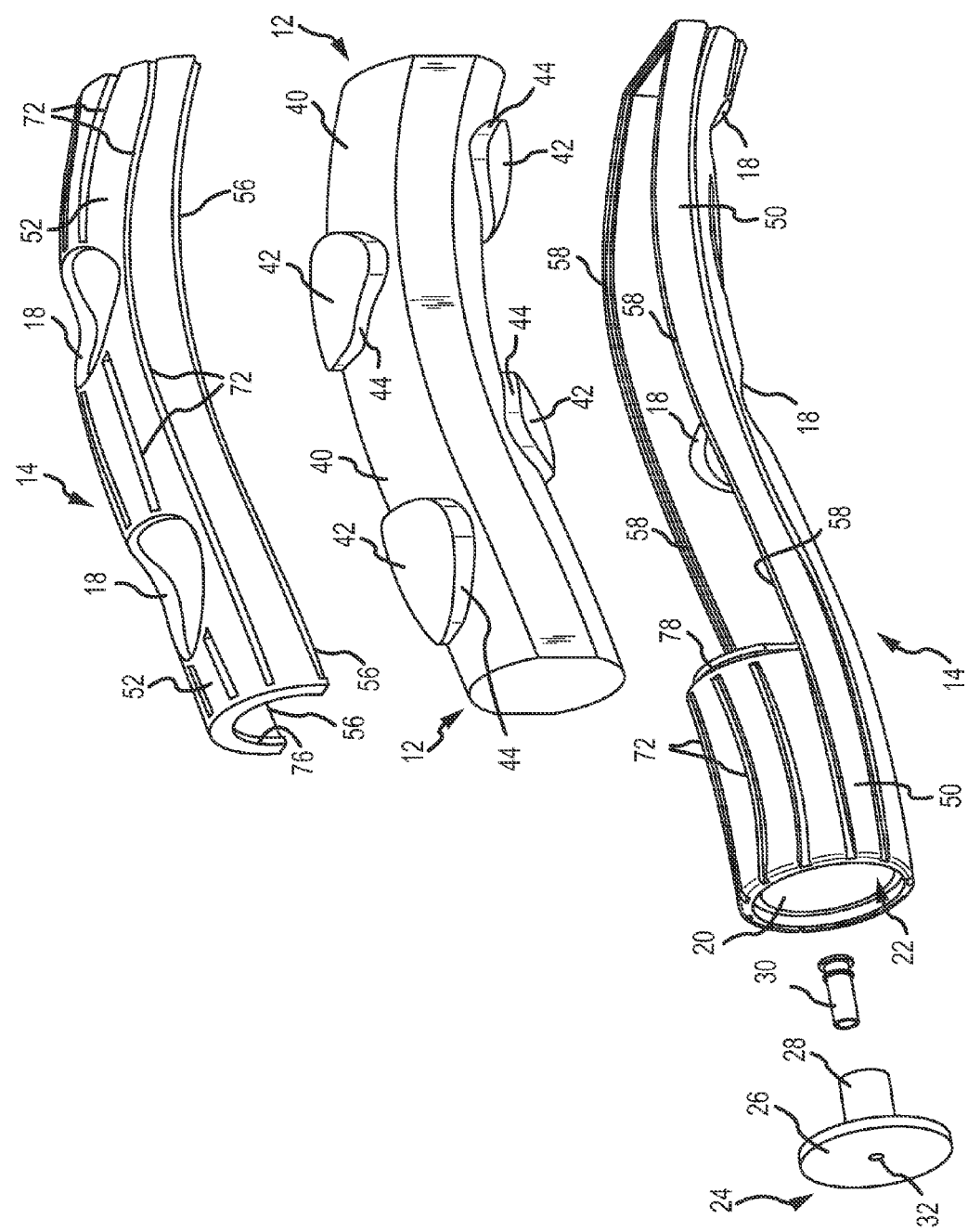

PET TOY WITH VARIABLE ELASTICITY

CROSS REFERENCE TO RELATED APPLICATIONS

This application is a non-provisional application which claims priority to U.S. Provisional Patent Application No. 62/151,505, entitled "Soft Durable Chew Toy" and filed on Apr. 23, 2015, the entire disclosure of which is hereby incorporated herein by reference.

FIELD OF INVENTION

The invention relates to pet toys, and more particularly, to a pet toy having variable elasticity by use of integrated yet distinct materials within the pet toy.

BACKGROUND OF THE INVENTION

Due to the increased commercialization of pet products and particularly pet toys, there are now a wide range of commercially available pet toys with distinct functions. Pet toys can be made from many different types of materials along with a nearly limitless number of shapes and colors.

One general category of pet toys is those made of a flexible or elastomeric material, such as rubber. These toys, if made from quality materials, can withstand the biting action of an animal, and can keep an animal occupied for extended periods of time. It is known to place treats in these types of toys to increase the interaction of the animal with the toy. A sound emitting device, often referred to as a "squeaker," is also known to be placed inside the toy to further stimulate the animal. Many rubber pet toys are made of a single layer of poor quality rubber material. An animal may therefore chew through and destroy the pet toy in a relatively short period of time.

Another general category of pet toys are those which may generally be referred to as "plush" toys. These types of toys are made from different types of cloth or fabric, and may also include material woven into strands, such as nylon rope. A plush toy is typically stuffed with a fibrous material, such as polyester stuffing, to provide the toy with an increased thickness or bulk that enables the animal to chew on the toy. Because the fibrous material is not strong enough to prevent the teeth of the animal from fully penetrating the outer cloth or fabric covering, plush toys are prone to being easily destroyed by the animal chewing through the outer covering. Plush toys may also include squeakers to further stimulate the animal.

Whether a pet toy is made from a flexible/elastomeric material or is a plush toy, the most common construction is one in which the pet toy has a single layer that defines the dominant characteristic of the pet toy in terms of its responsiveness to being chewed or otherwise played with. For example, a rubber toy with a single layer will typically deform in a uniform manner once it is chewed, and the toy will otherwise respond to activation by the animal in a uniform or consistent manner. If a squeaker is incorporated within the pet toy, the activation of the squeaker can similarly be defined as reacting uniformly to activation by the animal chewing on the toy to generate sound. For plush toys, the reaction or response can also be generally characterized as being uniform or consistent, considering the toys are typically made from a single layer of material and are stuffed with a single type of material.

Considering the common forms of construction for many types of pet toys, there is a need to provide a pet toy with integrated yet distinct materials that may help to better stimulate an animal with multiple responsive features achieved by use of materials that have variable elasticity. There is also a need to provide a pet toy that is robust enough to withstand the prolonged biting action of an animal, but is relatively simple in construction and therefore can be produced at a reasonable cost. There is also a need to provide a pet toy that is constructed in a modular form in which parts of the toy that may be more easily destroyed can be replaced without having to dispose of the entire pet toy.

The invention described below provides solutions to many limitations in the prior art, yet incorporates a construction that is robust enough to withstand the prolonged biting action of an animal. The invention also provides a pet toy that is relatively simple in structure, but provides multiple distinct features which may enhance an animal's interaction with the pet toy.

SUMMARY OF THE INVENTION

The invention includes a pet or animal toy incorporating distinct materials having different elastomeric or elastic features, and selected other features that may enhance interaction of the toy with an animal. In preferred embodiments, the pet toy is constructed to include an inner or internal member and an outer shell or cover that overlaps and covers selected portions of the inner member such that the exposed exterior surface of the toy includes both the inner member and shell. The inner member is made from a more elastic or compressible material, while the outer shell is made from a stiffer or more resilient material, yet the outer shell still maintains an elastomeric response to deformation such as when the pet toy is squeezed during play.

In another aspect or feature of the invention, it can be considered one that provides an exposed exterior surface with varying compressibility, flexibility, or texture to enhance an animal's play with the pet toy. Some animal behaviorists theorize that animals may be better stimulated with pet toys that provide multiple features as opposed to a single feature common with many single material pet toys.

The terms "elastic," "elasticity," or "elastomeric" as used herein with respect to the material of the invention, may be generally defined as the ability of the material to resume its normal shape after being stretched or compressed, or the ability of the material to spring back into shape.

The terms "flexible" or "flexibility" as used herein with respect to the material of the invention may be generally defined as the capability of the material to bend or fold without breaking or otherwise suffer permanent deformation.

The terms "compressible" or "compressibility" as used herein with respect to the material of the invention may be generally defined as the capability of the material to change volume in response to pressure applied to the material causing the material to deform.

The term "texture" as used herein with respect to the material of the invention may be generally defined as the appearance, "feel," or consistency of a surface of the material.

According to another feature of the invention, a noise making module or squeaker may also be incorporated within the pet toy to enhance animal interaction. The outer shell may have an interior chamber or open space which receives the squeaker module, and keeps it in a relatively protected position within the interior chamber.

According to another feature of the invention, the pet toy may be provided in a multiplicity of shapes and configurations in which selected portions of the inner member may be exposed resulting in the exposed exterior surface of the pet toy having distinct regions that are either made from the outer shell or the inner member.

Examples of materials that may be selected include closed cell foam for the inner member and a selected polymer, rubber, or combinations thereof, for the outer shell. The closed cell foam may be manufactured in a foam molding process, and may include material such as polyethylene foam. Polyethylene foam has a number of advantages: it is non-toxic and resistant to mildew, mold, and bacterial rot. The selected material for the outer shell may also be created in a molding process, and one particularly advantageous material that may be used includes thermoplastic rubber (TPR). Under one general description or definition of TPR, it may be considered a thermoplastic rubber that has melting and/or molding properties of plastic while still maintaining some advantageous flexible and elastomeric properties of rubber. One distinguishing characteristic of TPR as compared to a thermoplastic elastomer (TPE) is that TPR may have a "shiny" or reflective side. In this regard, having one surface that is reflective may enhance visual characteristics of the toy, which in turn, may better attract an animal.

The specific shape of the pet toy may take many forms. Considering that the inner member and outer shell may be manufactured in a molding process, current molding technology therefore permits the molding of complex shapes so that the pet toy may take many different forms. Commensurate with specific embodiments disclosed herein, examples of shapes for the pet toy may include a spherical shape, a composite of spherical elements joined to one another, a bone shape, a stick or twig shape, and others. Each of these shapes incorporates the inner member that is partially covered by the outer shell such that the exposed exterior surface of the pet toy comprises both elements of the inner member and the outer shell.

According to another feature of the invention, the interior chamber of the outer shell that houses the squeaker may include a chamber housing which is inserted within a large central opening of the inner member. In this manner, the inner member and outer shell have an interlocking configuration which further enhances stability of the connection between the inner member and outer shell. Also, the chamber housing provides some interior support for the inner member to prevent it from being over-stretched or over-deflected by the animal chewing and playing with the toy, which may otherwise unnecessarily weaken or damage the inner member.

According to one general method of manufacture, the pet toy is assembled by securing the noise making device in the outer shell. The outer shell may be molded in two half or bisected sections, and assembly of the half/bisected sections is achieved along matching and opposing side edges of the half sections. The inner member may have one or more protrusions that are received in openings or apertures molded in the outer shell. The protrusions may be configured so that the exposed surfaces of the protrusions are flush with the surrounding outer surfaces of the outer shell, or the protrusions may extend beyond in outer surfaces. In either case, the inner member is frictionally held in place, at least in part, by contact of the protrusions with rims or edges defining the openings in the outer shell.

Considering the above features and characteristics of the invention, in one aspect of the invention, it may be considered a pet toy comprising: (i) an outer shell having at least one opening formed therein and being made with a material having a first elasticity, compressibility, flexibility, or texture; (ii) an inner member placed within said outer shell and having at least one protrusion extending through a corresponding at least one opening of said outer shell, said inner member being made with a second different material having a second different elasticity, compressibility, flexibility, or texture; (iii) a noise making module secured within an interior chamber of said outer shell; and (iv) wherein an exterior exposed surface of said pet toy comprises portions of both said outer shell and said inner member.

Other features of the first aspect of the invention may include: wherein the outer shell is molded in half sections and the sections are joined to one another to assemble the pet toy; the half sections are each substantially symmetrical about an axis; the half sections of the inner and outer shells are sectioned along a substantially common joining line defined by contact between opposing joining surfaces of the half sections; wherein the outer shell includes a shell base and a shell cap connected to the shell base; the outer shell further includes a chamber housing extending from the shell base, the chamber housing defining the interior chamber; the inner member includes a central opening formed therein to receive the chamber housing of the outer shell resulting in an interlocking configuration; a plurality of external features formed on the exterior exposed surfaces; a noise making module mount secured to the outer shell and covering an open end of the interior chamber; and the interior chamber is formed at a selected end of the outer shell and a noise making module mount is secured to the outer shell to cover an open end of the interior chamber.

In a second aspect of the invention, it may be considered a pet toy comprising: (i) an outer shell having at least one opening formed therein, and being made with a material having a first elasticity, compressibility, flexibility, or texture, said outer shell further having a chamber housing and said chamber housing defining an interior chamber; (ii) an inner member placed within said outer shell and having at least one protrusion extending through a corresponding at least one opening of said outer shell, said inner member being made with a second different material having a second different elasticity, compressibility, flexibility, or texture, said inner member further having a central opening formed therein to receive said chamber housing of said outer shell resulting in an interlocking configuration; and (iii) wherein an exterior exposed surface of said pet toy comprises portions of both said outer shell and said inner member.

Other features of the invention in connection with the foregoing second aspect include: a noise making module secured within the interior chamber of the outer shell; the outer shell is molded in half sections and the sections are joined to one another to assemble the pet toy; the half sections are each substantially symmetrical about an axis; the half sections of the inner and outer shells are sectioned along a substantially common joining line defined by contact between opposing joining surfaces of the half sections; and the outer shell includes a shell base and a shell cap connected to the shell base, the chamber housing connected to the shell base.

According to yet another aspect of the invention, it may be considered a method of stimulating an animal for play with a pet toy, the method comprising: (a) providing a pet toy including: (i) an outer shell having at least one opening formed therein, and being made with a material having a first elasticity, compressibility, flexibility, or texture; (ii) an inner member placed within said outer shell and having at least one protrusion extending through a corresponding at least one opening of said outer shell, said inner member being made with a second different material having a second different elasticity, compressibility, flexibility, or texture; (iii) a noise making module secured within an interior chamber of said outer shell; and wherein an exterior exposed surface of said pet toy comprises portions of both said outer shell and said inner member; and (b) giving the pet toy to an animal for play; and wherein the animal plays with the toy including biting the pet toy in which the outer shell and inner member provide a differential resilient and elastomeric response to the biting action of the animal.

Other features and advantages of the invention will become apparent from a review of the following detailed description, taken in conjunction with the corresponding drawings.

BRIEF DESCRIPTION OF THE DRAWINGS

FIG. 13 is a side elevation view of the pet toy of the invention in a third embodiment;

FIG. 14 is another side elevation view of the pet toy of FIG. 13;

FIG. 15 is an exploded perspective view of the pet toy of FIG. 13; and

FIG. 16 is a cross-section illustrating interior details of the pet toy of FIG. 13.

DETAILED DESCRIPTION

Figure 1:
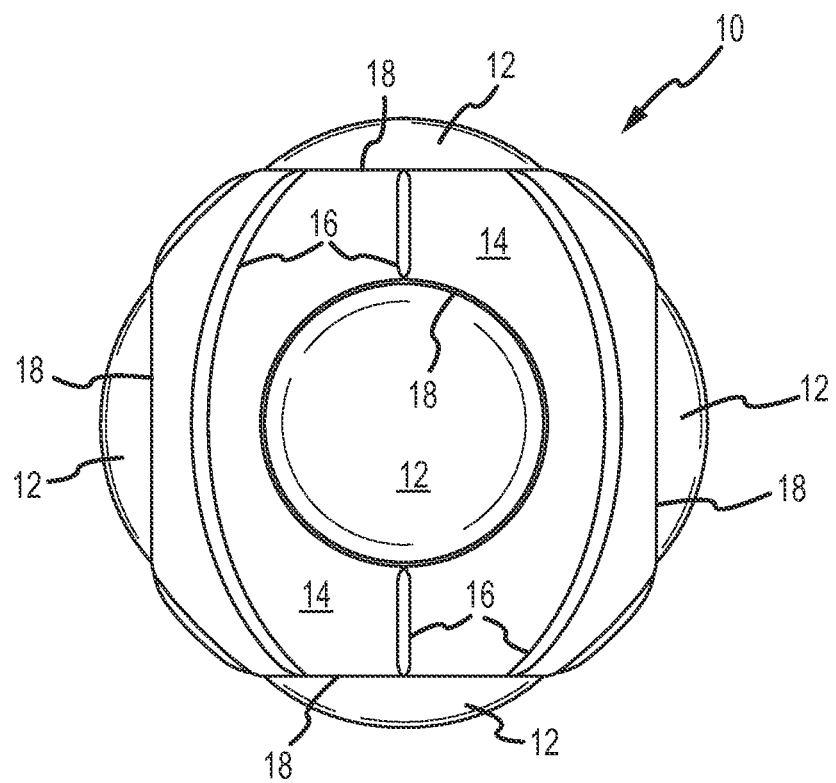
FIG. 1 is a side elevation view of the pet toy of the invention in a first embodiment.
Figure 2:
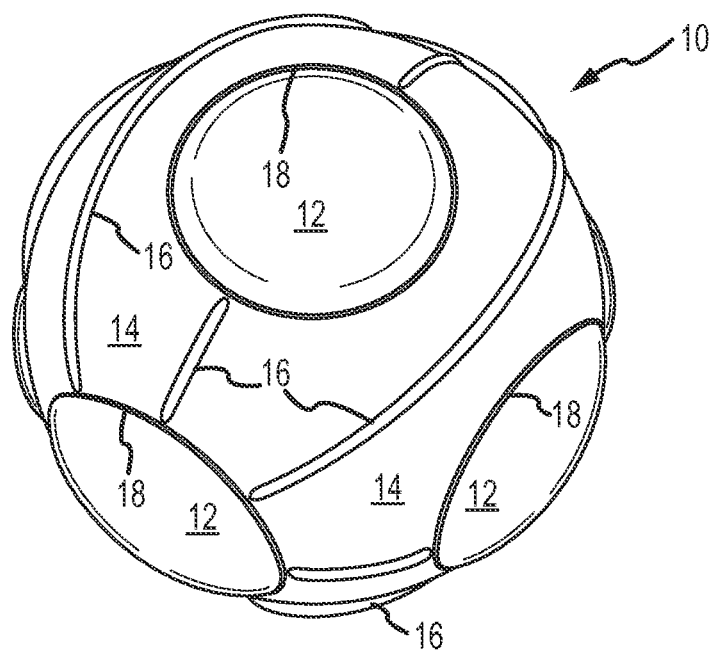
FIG. 2 is a perspective view of the pet toy of FIG. 1.

The pet toy of the invention 10 is illustrated in a first preferred embodiment at FIGS. 1-5. The particular construction of the pet toy in this first embodiment shows a two-piece or two component structure including an inner member 12 and an outer shell or cover 14. The outer shell 14 has a plurality of openings or apertures defined by rims or edges 18. As shown, there are six substantially equal sized openings formed in the outer shell. Additional structural support to the shell can be provided by stiffening ribs 16. These ribs 16 also provide an irregular surface feature attractive to animals when biting or chewing on the toy.

Figure 3:
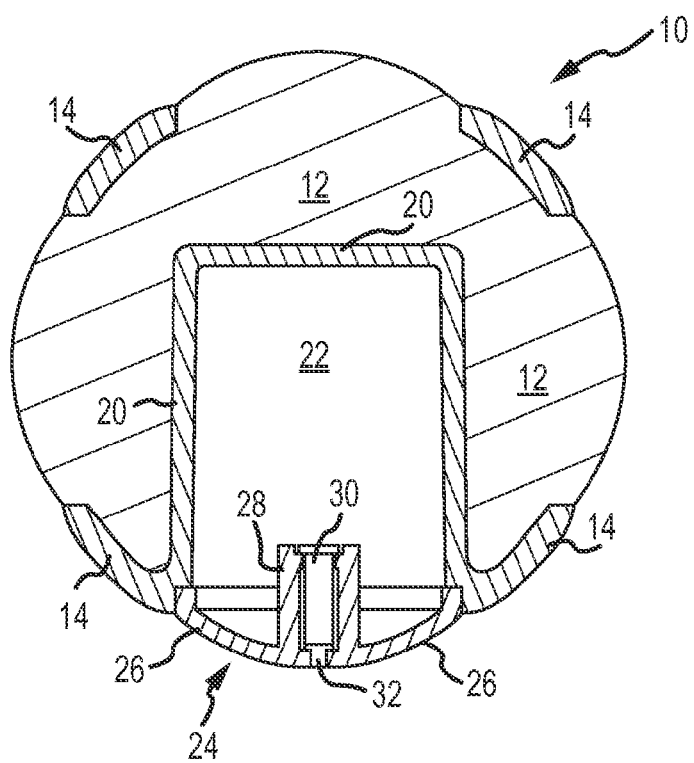
FIG. 3 is a cross-section illustrating interior details of the pet toy of FIG. 1.
Figure 5:
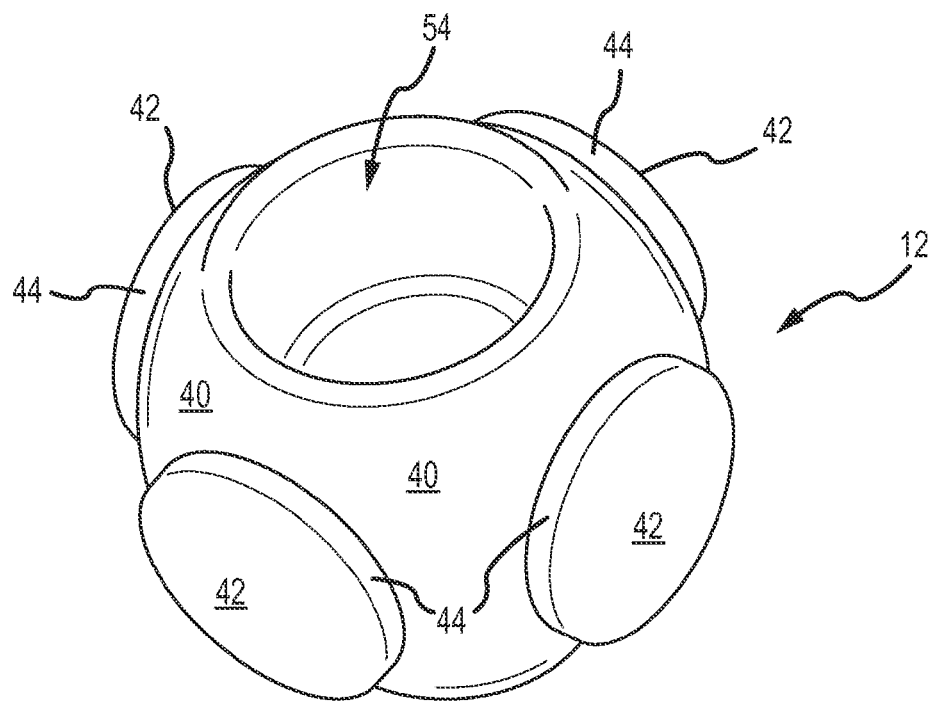
FIG. 5 is an enlarged perspective view of the inner member of the pet toy of FIG. 1.
Figure 4:
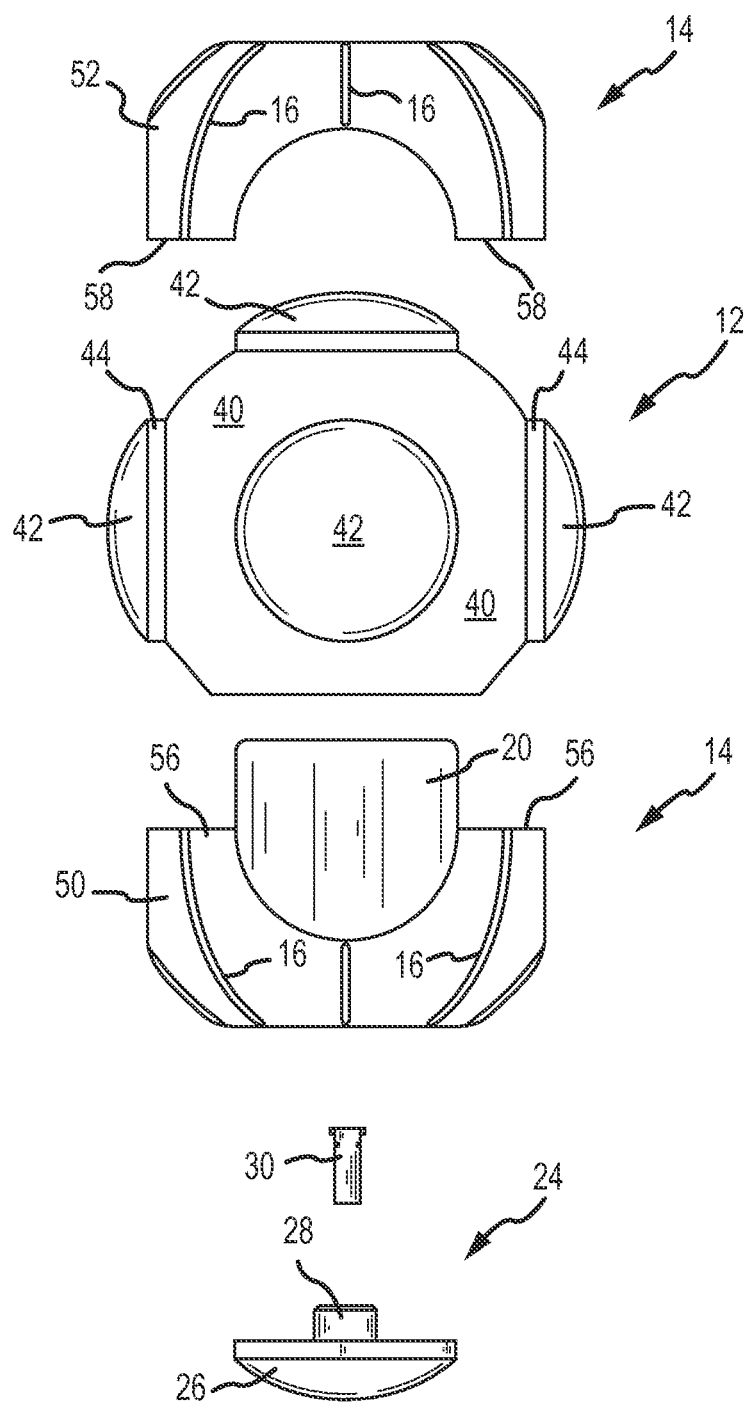
FIG. 4 is an exploded side view of the pet toy of FIG. 1.
Figure 6:
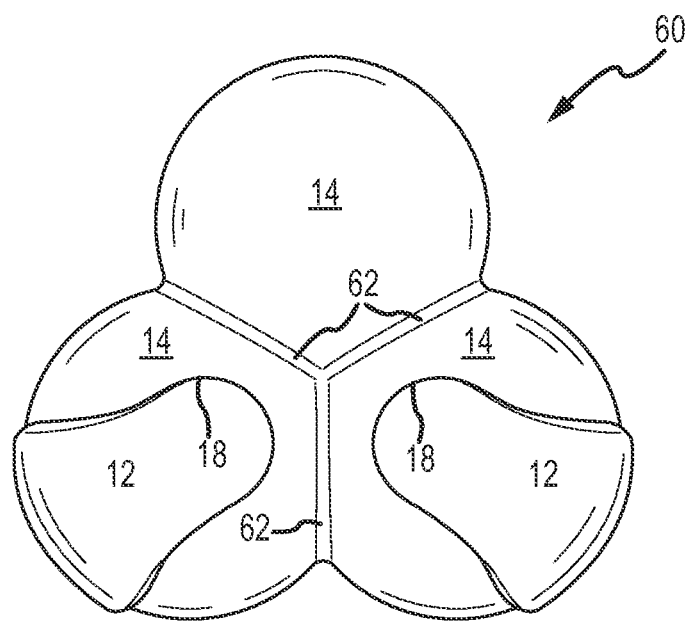
FIG. 6 is a top plan view of the pet toy of the invention in a second embodiment.
Figure 7:
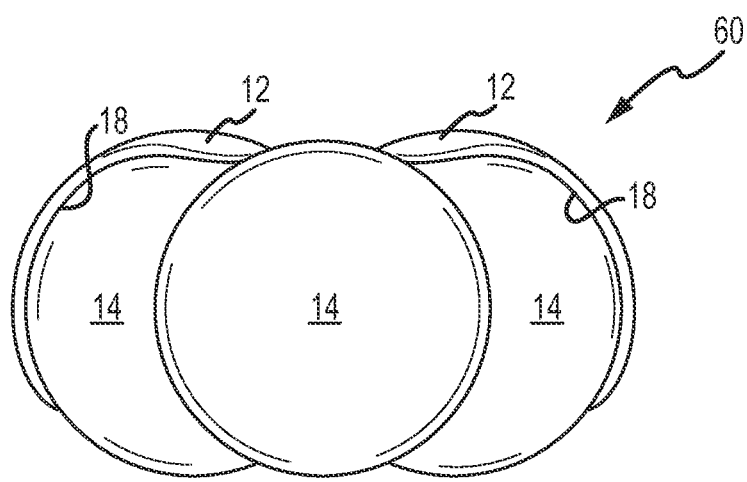
FIG. 7 is a side elevation view of the pet toy of FIG. 6.
Figure 8:
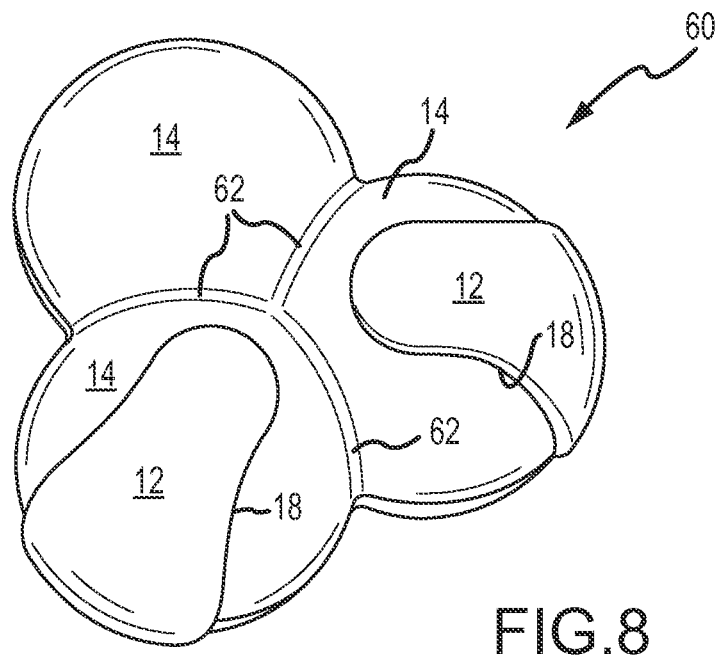
FIG. 8 is a top perspective view of the pet toy of FIG. 6.
Figure 9:
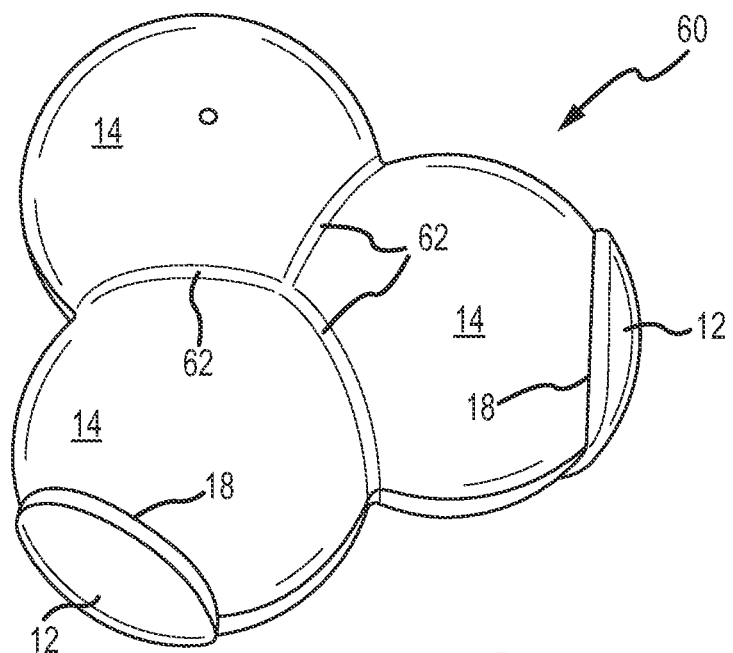
FIG. 9 is a bottom perspective view of the pet toy of FIG. 6.
Figure 10:
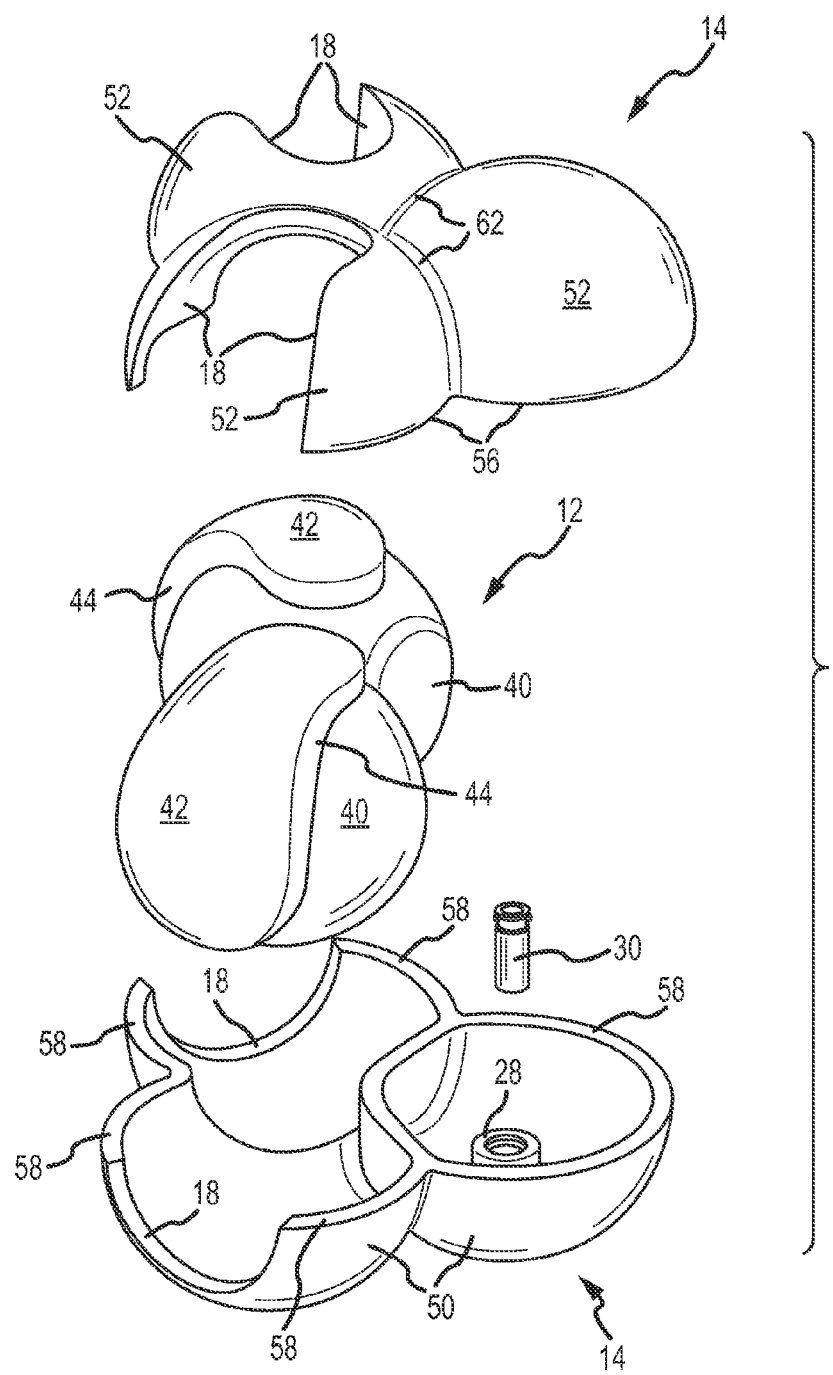
FIG. 10 is an exploded perspective view of the pet toy of FIG. 6.
Figure 11:
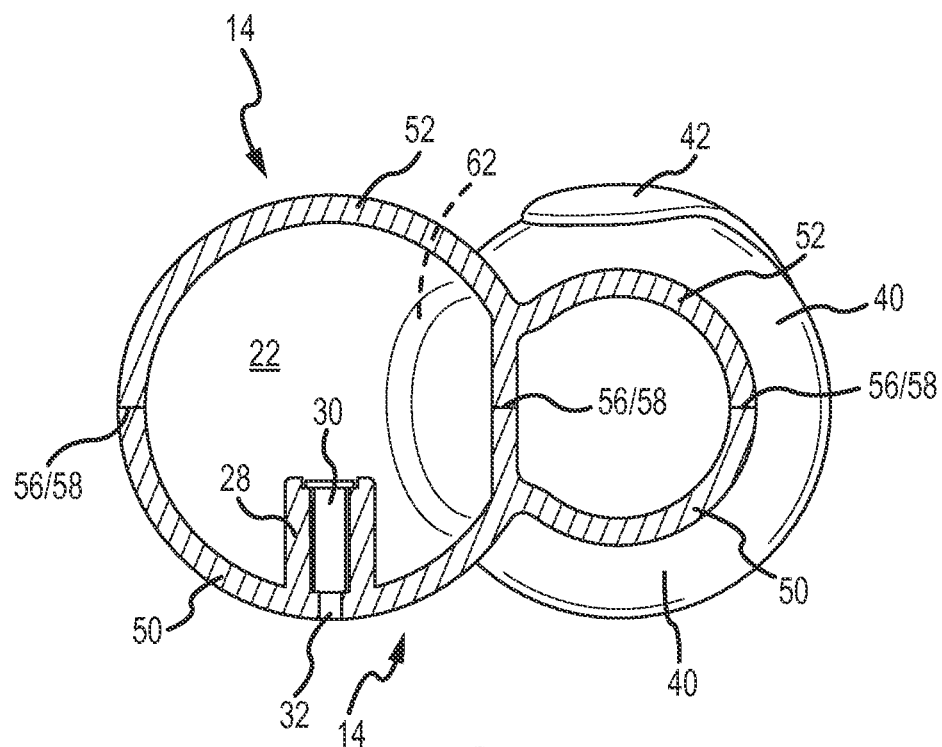
FIG. 11 is a cross-section illustrating interior details of the pet toy of FIG. 6.

Referring specifically to FIGS. 3-5, the toy 10 is illustrated in further detail. With reference to the outer shell or cover 14, it may be molded in two separate halves or pieces. Referring to FIG. 4, a first piece includes a shell base 50 with a chamber housing 20 which extends from the base 50. The other piece includes a shell cover 52. The base 50 has a first meeting or joint surface 56 which abuts the second meeting or joint surface 58 of the shell 52 when the pet toy is assembled. A squeaker mount 24 is used to secure the squeaker 30 to the outer shell 14. Specifically, the squeaker mount 24 has an outer head 26 and a squeaker holder 28. The mount 24 is attached to the lower surface of the base 50 as the base 50 is oriented in FIGS. 3 and 5. The squeaker 30 may include a noise producing element, such as a flexible reed (not shown) that is mounted within the body of the squeaker 30 so that air traveling through the body of the squeaker 30 results in vibration of the reed to generate sound. As shown in FIG. 3, the chamber housing 20 defines an interior chamber 22. As the pet toy 10 is squeezed, air within the chamber 22 is forced through the body of the squeaker 30 and out the aperture 32 in the cap 26 to generate sound. When the pet toy decompresses or re-inflates, air passes back through the aperture 32 and through the squeaker 30 which may also generate a second sound.

As best seen in FIG. 5, the inner member 12 may be further defined as having a central body 40 with protrusions 42 that extend beyond the outer surface of the body 40. A relatively large central opening 54 is formed in the body of the inner member 40 to receive the chamber housing 20 of the outer shell 14. Placement of the chamber housing 20 within the central opening 54 of the inner member 12 creates a locking configuration with respect to the inner member 12 and the outer shell 14. The protrusions 42 align with the openings in the outer shell. The protrusions 42 have peripheral surfaces 44 which frictionally engage the corresponding edges 18 of the outer shell 14.

Referring to FIGS. 6-12, a second embodiment 60 of the invention is illustrated. The shape of this embodiment includes three separate bulbous or partial spherical elements that are joined to one another along three corresponding grooves or channels 62. The same reference numerals used in the detailed description of the first embodiment correspond to the same or similar structural features in this embodiment.

Figure 12:
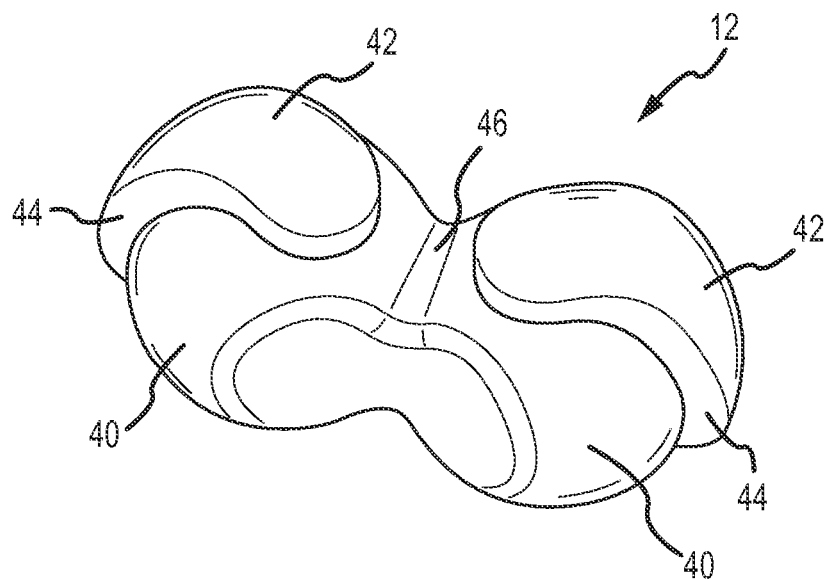
FIG. 12 is a perspective view of the inner member of the pet toy of FIG. 6.

The particular configuration of the inner member 12 includes two bulbous or spherical shaped elements that are joined to one another at bridge or connection area 46 (see FIG. 12). Each bulbous shaped element has a protrusion 42 that extends through a corresponding opening in the outer shell 14. The outer shell 14 has the three separate bulbous or partial spherical elements in which two of those engage the inner member 12, and one element is used to house the squeaker 30 as shown (see FIG. 10). Accordingly, the interior chamber 22 is defined as the open-space for the third bulbous shaped element as formed by the connection between the shell cover 54 and shell base 50.

Referring to FIGS. 13-16, a third embodiment 70 is illustrated in the shape of a stick or twig. The same reference numerals used in the detailed description of the first embodiment correspond to the same or similar structural features in this embodiment.

One feature added in this embodiment is a plurality of grooves or irregularities 72 that are disposed and spaced along the outer surface of the outer shell 14. These surface irregularities are intended to provide the toy with additional variances in the texture of the pet toy which may enhance interaction with an animal. The feature also helped create the visual impression that the toy resembles a stick or twig. The openings formed in the outer shell 14 receive the protrusions 42 of the inner member 12, and the protrusions are shown as extending beyond the outer surface of the outer shell.

Referring more particularly to FIGS. 15 and 16, interior details of the pet toy are shown in which the inner member 12 is received within the base 50 of the outer shell, and the shell cover 52 extends along a length of the pet toy corresponding to the shape and length of the inner member 12.

One portion of the outer shell 14 is reserved to create space for the interior chamber 22. More specifically, one end of the outer shell 14 is occupied by the interior chamber 22, and the squeaker mount 24 is therefore secured at that end of the outer shell. As with the previous embodiments, deflection or compression of the pet toy around the shell base 50 results in air movement in and out of the interior chamber 22 which in turn, causes noise to be produced by the squeaker 30.

Another feature unique to this embodiment is the use of a flange 76 located at one end of the shell cover 52, and a groove 78 formed on the base 50 that receives the flange 76. In this way, the connection between the base 50 and shell cover 52 may incorporate a "snap fit" by placing the flange 76 within the groove 78.

With any of the embodiments, the two half sections of the outer shell may be connected to one another in a number of ways to include thermal welding, adhesive, and combinations thereof.

As evident from the detailed description, the invention incorporates distinct materials that offer differences in elasticity, texture, flexibility, and compressibility. An animal may be particularly attracted to these variances in the pet toy. The addition of the squeaker also may further stimulate an animal's desire to interact with the toy.

Other aspects or features of the invention may include differences in how the inner member is arranged with the outer shell. For example, instead of having uniform sized protrusions, the pet toy may adopt protrusions of different shapes and sizes. Further, the protrusions may extend beyond the outer surface of the shell at selected distances to create additional surface irregularities that may be attractive to an animal. It is also contemplated that one or more of the protrusions may have portions thereof that are recessed such that only part of the protrusions extend beyond the outer surface of the outer shell, while other portions may be recessed or set below the outer surface of the outer shell. Yet further, it is contemplated that both the outer shell and the inner member may be sold separately so that either of the elements can be replaced if damaged.

According to yet another aspect of the invention, it is contemplated that some portions of the inner member may be allowed to more easily slip or move within the outer shell in order to create another unique and variable characteristic. Therefore, while the illustrated embodiments show relatively uniform and continuous engagement between the peripheral surfaces of the protrusions with the edges, it may be desirable to have some of the peripheral surfaces slightly spaced from the edges, or to generally reduce the size of the body so that there is some allowed "play" or shifting between the outer shell and the inner member.

Although the invention is described in particular detail with respect to preferred embodiments and accompanying drawings, it shall be understood that the invention is not specifically limited to the preferred embodiments and is rather encompassed by the scope of the claims appended hereto.

What is claimed is:

1. A pet toy comprising:
an outer shell having at least one opening a plurality of openings formed therein and being made with a material having a first elasticity, compressibility, flexibility, or texture;
an inner member having a central body placed within said outer shell and having at least one protrusion a plurality of protrusions extending away from said central body, said plurality of protrusions each extending through a corresponding one of said plurality of openings of at least one opening of said outer shell, said inner member being made with a second different material having a second different elasticity, compressibility, flexibility, or texture;
a noise making module secured within an interior chamber of said outer shell;
a noise making module mount secured to said outer shell and covering an open end of said interior chamber; and
wherein an exterior exposed surface of said pet toy comprises portions of both said outer shell and said inner member.

2. A pet toy, as claimed in claim 1, wherein:
said outer shell is molded in half sections and the sections are joined to one another to assemble said pet toy.

3. A pet toy, as claimed in claim 2, wherein:
said half sections are each substantially symmetrical about an axis.

4. A pet toy, as claimed in claim 2, wherein:
said half sections of said outer shell is sectioned along a substantially common joining line defined by contact between opposing joining surfaces of said half sections.

5. A pet toy, as claimed in claim 1, wherein:
said outer shell includes a shell base and a shell cap connected to said shell base.

6. A pet toy, as claimed in claim 5, wherein:
said outer shell further includes a chamber housing extending from said shell base, said chamber housing defining said interior chamber.

7. A pet toy, as claimed in claim 6, wherein:
said inner member includes a central opening formed therein to receive said chamber housing of said outer shell resulting in an interlocking configuration.

8. A pet toy, as claimed in claim 1, further including:
a plurality of external features formed on said exterior exposed surfaces.

9. A pet toy, as claimed in claim 1, wherein:
said interior chamber is formed at a selected end of said outer shell.

10. A pet toy comprising:
an outer shell having at least one opening formed therein, and being made with a material having a first elasticity, compressibility, flexibility, or texture, said outer shell further having a chamber housing and said chamber housing defining an interior chamber;
an inner member placed within said outer shell and having at least one protrusion extending through said at least one opening of said outer shell, said inner member being made with a second different material having a second different elasticity, compressibility, flexibility, or texture, said inner member further having a central opening formed therein to receive said chamber housing of said outer shell resulting in an interlocking configuration; and
wherein an exterior exposed surface of said pet toy comprises portions of both said outer shell and said inner member.

11. A pet toy, as claimed in claim 10, further including:
a noise making module secured within said interior chamber of said outer shell.

12. A pet toy, as claimed in claim 10, wherein:
said outer shell is molded in half sections and the sections are joined to one another to assemble said pet toy.

13. A pet toy, as claimed in claim 12, wherein:
said half sections are each substantially symmetrical about an axis.

14. A pet toy, as claimed in claim 12, wherein:

said half sections of said inner and outer shells are sectioned along a substantially common joining line defined by contact between opposing joining surfaces of said half sections.

15. A pet toy, as claimed in claim 10, wherein:

said outer shell includes a shell base and a shell cap connected to said shell base, said chamber housing connected to said shell base.

16. A method of stimulating an animal for play with a pet toy, the method comprising:

providing a pet toy including: (i) an outer shell having at least one opening formed therein, and being made with a material having a first elasticity, compressibility, flexibility, or texture; (ii) an inner member placed within said outer shell and having at least one protrusion extending through said at least one opening of said outer shell, said inner member being made with a second different material having a second different elasticity, compressibility, flexibility, or texture; (iii) a noise making module secured within an interior chamber of said outer shell;

wherein an exterior exposed surface of said pet toy comprises portions of both said outer shell and said inner member;

giving the pet toy to an animal for play; and wherein the animal plays with the toy including biting the pet toy in which the outer shell and inner member provide a differential resilient and elastomeric response to the biting action of the animal.

17. A pet toy comprising:

an outer shell having at least one opening formed therein and a chamber housing extending within an interior surrounded by said outer shell;

an inner member having a central body placed within the interior of said outer shell, said inner member having at least one protrusion extending away from said central body and through said at least one opening of said outer shell, said inner member further having a central opening to receive said chamber housing;

a noise making module secured within said central opening of said interior member; and wherein an exterior exposed surface of said pet toy comprises portions of both said outer shell and said inner member.

* * * * *

UNITED STATES PATENT AND TRADEMARK OFFICE
CERTIFICATE OF CORRECTION

PATENT NO. : 10,051,838 B2
APPLICATION NO. : 14/840764
DATED : August 21, 2018
INVENTOR(S) : John James Stone Page 1 of 1

It is certified that error appears in the above-identified patent and that said Letters Patent is hereby corrected as shown below:

In the Claims

Column 7, Line 59, Claim 1 delete "at least one opening".

Column 7, Line 64, Claim 1 delete "at least one protrusion".

Column 7, Line 67 through Column 8, Line 1, Claim 1 delete "of at least one opening".

Signed and Sealed this
Twenty-fourth Day of December, 2019

Andrei Iancu
*Director of the United States Patent and Trademark Office*